Jan. 7, 1958  W. ZUBER  2,818,895
PLANING MACHINE, FOR WOODWORKING, IN PARTICULAR FOR PARQUET
Filed Dec. 21, 1955  3 Sheets-Sheet 1

INVENTOR:
Walter Zuber
By Bryant & Lowry
ATTYS.

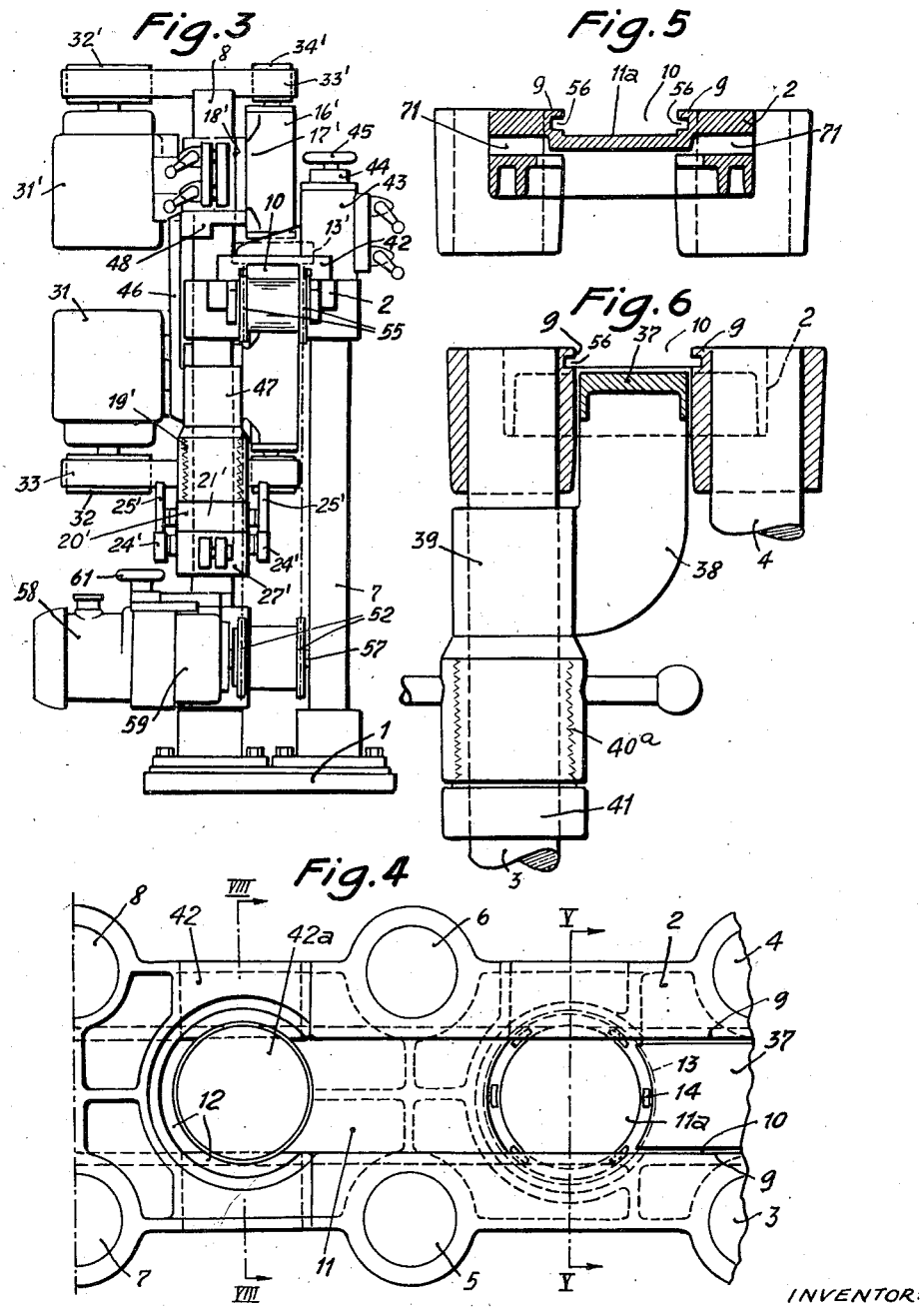

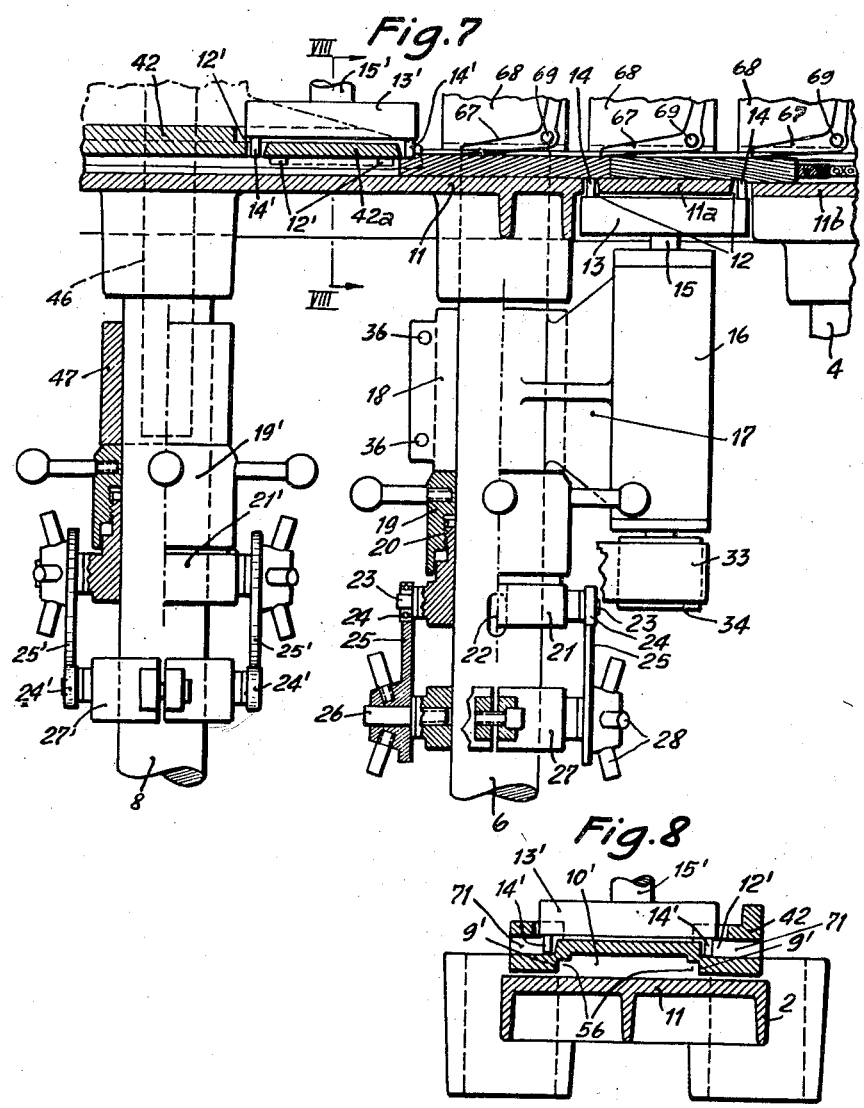

United States Patent Office 2,818,895
Patented Jan. 7, 1958

2,818,895

PLANING MACHINE, FOR WOODWORKING, IN PARTICULAR FOR PARQUET

Walter Zuber, Rheineck, Switzerland, assignor to Hasler & Co., Rheineck, Switzerland, a firm Application December 21, 1955, Serial No. 554,523

Claims priority, application Switzerland August 17, 1955

1 Claim. (Cl. 144—118)

The woodworking planing machines which have become known hitherto have that disadvantage that pieces of wood having a length of less than about 20 cm. cannot be machined satisfactorily, because it is not possible to guide short pieces of wood sufficiently, so that due to the vibration of the piece of wood it is not possible to achieve a smooth surface.

The planing machine for wood, in particular for parquet wood, is distinguished from the planing machines of this type which have become known hitherto substantially by being equipped with at least one planing cutter, whose knives rotate in a guiding device of an outer work table about a concentric inner work table, having the shape of a disk and being arranged in the plane of the planed surface.

It is advantageous to equip the planing machine with a lower and an upper work table and with a lower and an upper cutter in order to enable pieces of wood to be machined on their upper and lower surfaces.

The outer work table, which almost reaches the cutter, is conveniently designed so as to form with the disk-shaped inner work table a guide for the pieces of wood, bridging over the annular groove, so that the pieces of wood can be guided satisfactorily over a length of not less than 35 mm., and the wood can be machined without vibration.

The drawing shows an example of an embodiment of the invention, and:

Fig. 3 is a back view, omitting the exhaust ducts,

Figure 1:
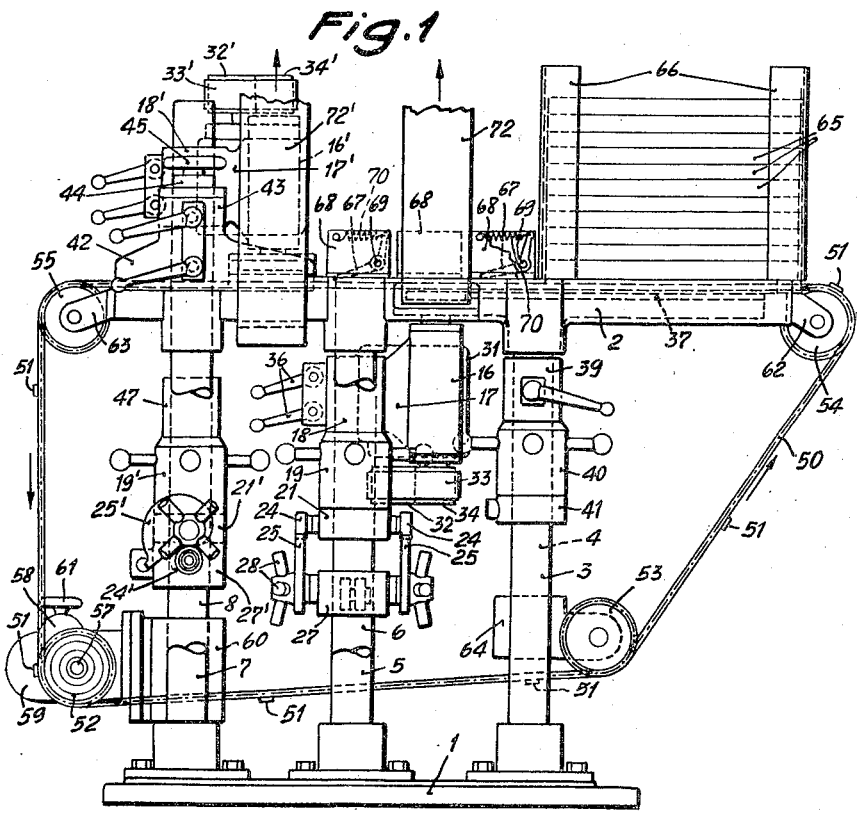
Fig. 1 is a side view of the planing machine.
Figure 2:
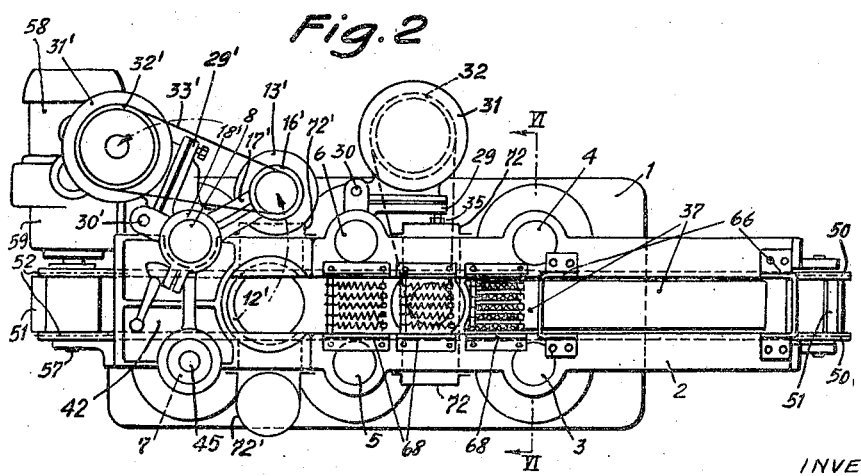
Fig. 2 is a plan view to Fig. 1.

Fig. 4 is a plan view, looking on the machine table with the lower work table and a part of the upper work table on a larger scale, Fig. 5 is a cross-section through the machine table with inner work table, along the line V—V in Fig. 4, Fig. 6 is a cross-section through the machine table with the adjustable work table along the line VI—VI in Fig. 2, on a larger scale, Fig. 7 is a partial longitudinal section through the planing machine, on a larger scale, Fig. 8 is a cross-section along the line VIII—VIII in Figs. 7 and 4.

The planing machine shown here is equipped with a base plate 1 and a machine table 2, connected by means of six vertical columns 3, 4, 5, 6, 7, 8, so as to form a rigid machine frame. A sunk longitudinal guide 10 for the pieces of wood which are to be machined is provided on the top surface of the machine table, and equipped on both sides with guide edges 9. The bottom 11 of the longitudinal guide is employed as a work table. An annular groove 12, Fig. 7, whose diameter is greater than the width of the work table 11, is arranged in the longitudinal guide. The knives 14 of a horizontal cutter 13, whose shaft 15 is supported in the vertical bearing 16 of a bearing bracket 17, run in the annular groove 12, and the bearing bracket 17 is supported by means of a clamp 18 on the column 6 so that its height and angular position can be adjusted. The height of the bearing bracket 17 is adjusted so that the upper cutting edges of the cutter 14 are in the plane of the outer work table 11 and of the inner work table 11a. A nut 19 provided with handles is employed for the vertical setting of the bearing bracket 17; the nut is working on a threaded portion 20 of a quick-setting ring 21, which can be set vertically on the column 6 and is secured against rotation by means of a key guided in a slot 22, and enables a fine vertical adjustment of the bearing bracket 17 to be effected. The quick-setting ring 21 is supported on two diametrically opposite horizontal pins 23 in rollers 24, one roller to each pin, which bear respectively against two cams 25. The said cams are supported on pins 26 of an annular support 27 clamped to the column 6, and provided with handles 28, by means of which the profile cams 25 can be rotated slightly, with the assistance of a tubular lever, so as to adjust the bearing bracket 17 quickly to a convenient height. The setting of the bearing bracket 17 to its lower position is intended to enable it to be swung outward, in order to remove or replace the cutter 13. A motor 31 (Figs. 2 and 3) supported on the bracket 29 and pivoted on a pin 30 of the bracket is employed to drive the milling cutter 13; the motor belt pulley 32 is connected by means of a belt 33 to the belt pulley 34 on the cutter shaft 15. By means of clamping screws 35 on the bracket 29, bearing against the base plate of the motor 31, the tension of the driving belt 33 can be adjusted. After the bearing bracket 17 has been set to its correct height, it is fixed in its position by tightening the clamping screws 35.

A work table 37, whose height can be adjusted, is provided for setting the feed in the front part of the guide 10 in the machine table 2. The work table 37 can be set vertically on the column 3 of the machine frame by means of a support 39 (Fig. 6) on an arm 38 of the adjustable work table. A nut 40 is employed for the vertical setting; the nut can be adjusted on a threaded portion 40a of a supporting sleeve 41 fixed on the column 3.

An upper work table 42 is provided for planing the top side of the pieces of wood; it is arranged above the rear part of the machine table 2, and can be set vertically to the desired height by means of a bearing 43 on the column 8, and by means of a spindle 45 (Fig. 3) equipped with a hand wheel and engaging with a nut 44 in the support 43, with the inner end of the spindle bearing against the column 7. The upper work table is provided on its under side with a longitudinal guide 10', Fig. 8, having guide edges 9' on both sides. The work table 42 is interrupted by an annular groove 12', open above, whose diameter is greater than the width of the longitudinal guide 10'. The knives 14' of another horizontal cutter 13' rotate in the annular groove 12. The lower cutting edges of the knives 14' pointing downward are in the same plane as the disk-shaped work table 42' outside and inside the annular groove 12. The shaft 15' of the second milling cutter 13 is supported in the vertical bearing 16' (Fig. 2) of another bearing bracket 17', whose height and angular position can be adjusted by means of a clamp support 18' on the column 8. A nut 19' (Fig. 7) is employed for the vertical setting of the bearing bracket 17'. 46 is a bridging bar supporting two guide rings 47 and 48 on the column 8 (Fig. 3). The lower guide ring 47 is supported on the nut 19' while the lower guide ring 48 (Fig. 3) acts as a support for the bearing bracket 17'. The nut 19' is adjustable on a threaded portion 20' of a ring 21', which is vertically adjustable on the column 8, and whose rotation is prevented by means of a key. Two profile cams 25' are supported on two lateral pins, diametrically opposite on the ring 21', by means of which the ring 21' is supported on rollers 24' through cams 25'. The said rollers are supported on pins of a supporting sleeve 27', which is clamped to the column 8. In order to enable the bearing bracket of the other milling cutter to be swung out sideways, the bearing bracket 17' must be placed in its upper position by rotating the profile cams 25'. A motor 31' supported on a bracket 29' and pivoted on a pin 30' of this bracket is employed to drive the other milling cutter; the motor belt pulley 32' is connected by means of a driving belt 33' to a belt pulley 34' on the cutter shaft 15'. The means for tensioning the driving belt 33' are of the same nature as those for the first motor.

The depth of feed on the upper side of the wood pieces is partly determined by the vertical adjustment of the upper work table, by means of the spindle 45 equipped with a hand wheel, and partly by the vertical adjustment of the bearing bracket 17' by means of the nut 19', where the upper work table 42 and the lower cutting edges of the cutter 14' must be in the same plane.

An endless conveyor is employed to convey the wood; it consists of two lateral endless chains 50 and chain grippers 51 arranged with uniform spacing on the chains and connecting them. The chains 50 of the conveyor run over four pairs of sprocket wheels 52, 53, 54, 55, and are guided in longitudinal slots 56 of the guide bars 9, 9'. The pair of sprocket wheels 52 is keyed to a driving shaft 57 and is driven by a motor 58 through a variable speed drive 59. The motor 58 with the drive 59 is mounted on a bracket 60 provided on the machine frame. 61 is a hand wheel by means of which the desired speed of the conveyor can be set. The pairs of sprocket wheels 54 and 55 are supported on pins on fixed brackets 62 and 63 of the machine frame; while the pair of sprocket wheels 53 is supported on the shaft of a bracket 64, whose height can be adjusted on the column 4.

The pieces of wood 65 which are to be planed are stacked in an open magazine 66 on the front part of the machine table 2, and are pushed away from underneath the stack by the conveyor. In order to keep the pieces down when they pass the first cutter 13 and to feed them against the upper cutter 13', three consecutive groups of hold-downs 67 are provided, by means of which the pieces of wood are pushed against the work tables 37, 11a and 11. The hold-downs 67 are supported in open casings 68 on the pins 69, one next to the other, so that they can swivel, and are held in position by means of tension springs 70, which pull the hold-downs 67 against the wood.

Exhaust ducts 71, Figs. 5 and 8, to which exhaust pipes 72, 72' are connected, and opening into the annular grooves 12 and 12', are provided in the machine table 2 to remove the chips.

After the work table 11b has been set for the thickness of the chips on the underside of the wood, and after setting the upper work table 42 and the cutter 13' for the thickness of the chips to be removed from the upper side of the wood, and to adapt the machine to the thickness of the material, the clamping supports of the bearing brackets 17 and 17' and the clamping support 43 of the upper work table 42 can be fixed and the machine can be started up.

The speed of the conveyor feed can be adjusted by means of the hand wheel 61 of the drive from 5 metres per minute to 32 metres per minute. A friction clutch is provided in the usual manner in the conveyor drive, so that fracture of the chain is prevented if the resistance against the motion of the conveyor should rise excessively.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claim.

Having thus described by invention, I claim as new and desire to secure by Letters Patent:

A planing machine for wood working, in particular for parquets and comprising in combination at least one cutter, in which knives of said cutter rotate in a guiding device of a work table about a disk-shaped inner work table, concentric with said cutter and in the plane of the cutting edges, said cutter being supported on a bearing bracket which carries also a drive motor and whose height is adjustable and which can be swung out laterally and is supported on a machine frame, the adjustment of the height of said cutter and said bearing bracket carrying said cutter drive motor being equipped with a fine adjustment and a high-speed setting either of which can be operated, said height adjustment device of said bearing bracket being provided with a threaded ring which can be displaced vertically on a column of said machine frame, and whose rotation is prevented, and whose position can be adjusted by means of a profile cam supported on a roller, with reference to a fixed supporting sleeve of said column; and with a fine adjustment nut which is screwed on the threaded portion and supporting said bearing bracket.

References Cited in the file of this patent

UNITED STATES PATENTS

| Number | Name | Date |
|---|---|---|
| 7,949 | Beers et al. | Feb. 25, 1851 |
| 305,563 | Baer | Sept. 23, 1884 |
| 312,444 | Disston | Feb. 17, 1885 |
| 396,934 | Hutchinson | Jan. 29, 1889 |
| 397,568 | Rudolph | Feb. 12, 1889 |
| 399,900 | Hoyt | Mar. 19, 1889 |
| 525,612 | Nier | Sept. 4, 1894 |
| 559,396 | Meyer | May 5, 1896 |
| 785,699 | Bemis | Mar. 21, 1905 |
| 885,611 | Gworek | Apr. 21, 1908 |
| 1,003,099 | Freeman | Sept. 12, 1911 |
| 1,569,490 | Hiscock | Jan. 12, 1926 |
| 1,602,041 | Neal | Oct. 5, 1926 |
| 1,823,200 | Johnson | Sept. 15, 1931 |
| 1,907,479 | Bendix | May 9, 1933 |
| 2,102,186 | Nicholson et al. | Dec. 14, 1937 |
| 2,512,164 | Mann | June 20, 1950 |
| 2,541,533 | Motkowicz | Feb. 13, 1951 |

FOREIGN PATENTS

| Number | Country | Date |
|---|---|---|
| 463,863 | France | Dec. 27, 1913 |